United States Patent [19]

McKenzie

[11] 3,960,371

[45] June 1, 1976

[54] COMPACT TREE CLAMP

[75] Inventor: Ian McKenzie, Lambeth, Canada

[73] Assignee: Clark Equipment Company, Buchanan, Mich.

[22] Filed: Mar. 6, 1975

[21] Appl. No.: 556,062

Related U.S. Application Data

[62] Division of Ser. No. 452,171, March 18, 1974, Pat. No. 3,924,667.

[52] U.S. Cl. .................................. 269/55; 144/2 Z; 144/3 D; 269/58; 269/110
[51] Int. Cl.² ...................... A01G 23/08; B23Q 1/04
[58] Field of Search .................. 269/55, 14, 31, 56, 269/58, 110; 144/2 Z, 3 D, 34 R, 34 D, 309 A, 309 C

[56] References Cited
UNITED STATES PATENTS

| | | | |
|---|---|---|---|
| 1,590,107 | 6/1926 | Martin | 269/31 |
| 2,633,879 | 4/1953 | Andrus | 269/31 |
| 3,708,000 | 1/1973 | Duffty et al | 144/3 D |

*Primary Examiner*—Travis S. McGehee
*Assistant Examiner*—W. D. Bray
*Attorney, Agent, or Firm*—Harry G. Thibault

[57] ABSTRACT

A tree clamp, especially for a tree length harvester, having a compact arrangement of a movable jaw which folds partially inside of a fixed jaw and has a pivoted section to clamp the tree. The movable jaw and its pivoted section also grasp the butt end of the tree and lift it out of the teeth of the fixed jaw at the end of the processing step. The tree is then released and free to roll into a storage rack.

An automatic sequence control is provided that includes a pivoted plate on the clamp which is depressed by the tree to initiate processing steps without requiring the operator's attention.

5 Claims, 6 Drawing Figures

COMPACT TREE CLAMP

This is a division of application Ser. No. 452,171, filed Mar. 18, 1974, now U.S. Pat. No. 3,924,667.

BACKGROUND OF THE INVENTION

The invention pertains to the art of tree processors or mobile tree harvesters and especially the type referred to as tree length harvesters having a felling head which shears a tree at the ground and holds it upright and then pivots it to a horizontal position for delimbing and topping.

A tree length harvester of this type is disclosed in the copending application U.S. Ser. No. 363,936, filed May 25, 1973, now U.S. Pat. No. 3,905,407 claiming priority based on Canadian application Ser. No.: 163,290 filed Feb. 6, 1973, by inventors Ian McKenzie et al and assigned to the assignee of the present invention. Its operation is in a sequence that permits the felling head to return for a second tree while the cut tree is being delimbed and topped. This substantially reduces the over-all processing time per tree and increases the productivity of the machine.

In order to cycle the delimber while returning the felling head for a second tree, it is necessary to clamp the tree. But no clamp has heretofore been devised that functions properly on a tree length harvester and without interfering with the simultaneous processing of trees.

DESCRIPTION OF THE PRIOR ART

One difficulty is that the tree must be transferred from the felling head to the clamp. The combined stack height of the felling head and clamp becomes a factor in permitting the delimber to start out close enough to the butt end of the tree. When it fails to get behind all of the limbs, the trees must be partially delimbed by hand. To deal with this problem, the clamp should be as narrow as possible. The delimber can then be started very near the upper clamp on the felling head when the tree is laid in its horizontal delimbing position. This, however, requires the clamp to be very narrow.

Another problem has been the tendancy of the delimbed and topped tree to hang up after the delimber has cleared. That is, the tree is prevented from rolling laterally into the storage rack after being delimbed and topped. This stops the delimber from being recycled until the tree can be removed. Interruptions such as this cannot be tolerated in such a high production machine.

SUMMARY OF THE INVENTION

A compact tree clamp, especially for a tree length harvester, has a fixed jaw and a movable jaw closing on the fixed jaw. The fixed jaw has an arcuate tooth section. The movable jaw is pivoted at two locations. A first pivot is on the fixed jaw and allows the movable jaw to be partially folded or collapsed into spaced frame sections of the fixed jaw. When collapsed in this fashion, the tree is clamped in the teeth of the fixed jaw and prevented from axial movement by an arm of the movable jaw pivoted about a second pivot on the opposite side of the tree axis from the first pivot.

After delimbing and topping, the movable jaw is tilted up about the first pivot while the arm continues to hold the tree. This raises the butt end of the tree and shifts it laterally toward the storage rack. The arm is pivoted about the second pivot unclamping the tree to roll it into the storage rack.

In the application on a horizontal tree harvester, the clamp becomes a functional part of the over-all machine when it is considered that the felling head must transfer the tree to the clamp before delimbing can proceed and the felling head returned for a second tree.

In such a harvester, the tree clamp serves the function, not only of securely clamping the tree for delimbing, but also provides the capability of simultaneous processing which is fundamental to the high productivity of this type of harvester.

Consistent with this objective and method of processing full length trees, the present invention is viewed as a tree length harvester automatic sequence control including means (a pivoted plate) on the movable jaw actuated by a tree deposited on the fixed jaw, a fluid pressure source, an actuating circuit connected to said source including a control element (sequence valve), a first cylinder for pivoting the arm of the movable jaw actuated by the control element in one position to close the arm, means (first valve) in the actuating circuit operated by the arm when closed initiating the delimbed cycle, a second means (second valve) operated at the end of the delimber stroke to shift the control element to a second position, a second cylinder actuated in said second position to tilt the movable jaw, means (third valve) operated when the second cylinder is extended to cause said control element to operate the first cylinder and to open the arm releasing the tree which allows said first means (pivoted plate) to return causing the second cylinder to lower the movable jaw.

In the preferred embodiment, the movable jaw will have its arm pivoted on an axis parallel to the delimber axis. The entire movable jaw is also pivoted about a second or main pivot axis on the opposite side of the delimber axis. The first cylinder is carried on the movable jaw and is operable to pivot the arm about its pivot axis. The second cylinder extends between the spaced frame of the fixed jaw and is operable for pivoting the movable jaw about its main pivot axis. The arm has an interior arc, which when closed, overlies and partially encloses the tree. The movable jaw carries the pivoted actuating plate in such position that as the teeth penetrate the tree, which is forced down from above by the arm, the plate is automatically depressed initiating the cycle.

After delimbing and topping, the movable jaw is pivoted about its main axis by operating the second cylinder. The actuating plate remains engaged with the tree and in the depressed condition since the tree is still clamped by the arm of the movable jaw. The butt end of the tree is moved upwardly and laterally with respect to the delimber axis. At the uppermost position, the first cylinder is extended to open the arm of the movable jaw permitting the tree to roll down into the storage rack. This releases the actuating plate permitting the second cylinder to return lowering the movable jaw.

It is one advantage of the invention that the tree clamp has a dual capability. In the one case, the tree is secured against axial movement between the fixed and movable jaws while in the other case it is grasped and pivoted out of the fixed jaw by the movable jaw. Thus a principal advantage of the invention is a clamp that functions both as an axial tree clamp and tree ejection device for positive removal of the tree regardless of the slope on which the machine is operated.

Another advantage for tree length harvesters is that the clamping jaws form a compact arrangement without increasing the stack height to the detriment of the delimber operation.

A major advantage in the over-all function of a tree length harvester is that higher productivity is achieved because of positive ejection. The delimbed and topped tree is quickly and positively ejected to make room for the second tree after each delimbing and topping cycle.

A further major advantage is the provision of an automatic sequence control for a tree length harvester in which the tree clamp initiates the sequence.

These and other advantages will be readily apparent by referring to the following more detailed description wherein:

DESCRIPTION OF THE DRAWING

FIG. 1A is a partial view of the harvester depicting the motion of the felling head;

DESCRIPTION OF THE PREFERRED EMBODIMENT

Figure 1:
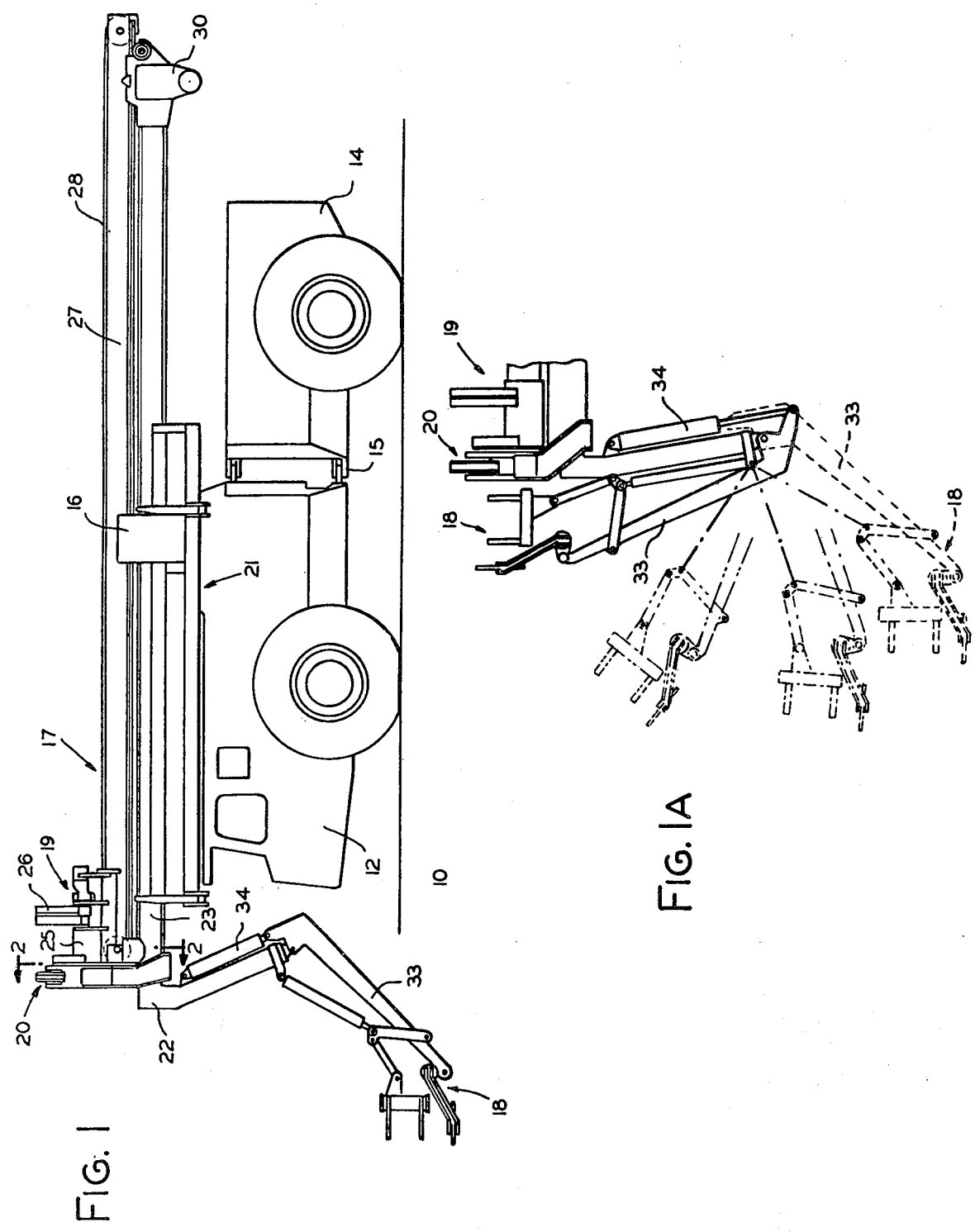
FIG. 1 is a side elevational view of a tree length harvester on which the tree clamp is mounted.

FIG. 1 shows a tree harvester 10 having front and rear sections 12, 14 articulated at 15. The front section 12 has a trunnion 16 on which is pivoted a tree length processor or harvester apparatus generally indicated by numeral 17. The apparatus 17 includes essentially a felling head 18, a delimber apparatus 19 a tree clamp 20 and a storage rack 21. For a more detailed description of such a harvester, reference is made to the aforementioned application U.S. Ser. No. 363,936 now U.S. Pat. No. 3,905,407. The felling head 18 is carried on a boom 22 telescoping within a tubular beam 23 which pivots on the trunnion 16. The delimber 19 includes a carriage 25 which cradles the tree on a bottom delimber knife (not shown) and has other delimber knives 26 which enfold about or partially encircle the tree. Topping knives, (not shown) are also on this carriage. The carriage 25 is pulled along a rail 27 by a cable 28 as the rail itself is propelled to the rear on the beam 23 by a cable and rum drive 30. A severed tree held by the felling head 18 in a substantially vertical position is rotated upwardly and rearwardly by pivoting the felling head on a boom arm 33 actuated by a cylinder 34 (FIG. 1A). In the uppermost position the felling head positions the tree butt end in the opened tree clamp 20. The delimber knives 26 and the topping knives of the delimber carriage 25 will also open to receive the tree. The clamp 20 must now be closed to permit the felling head to return for a second tree and the delimber carriage to commence its cycle. This is the position of the clamp shown in FIG. 1.

The Tree Clamp

Figure 2:
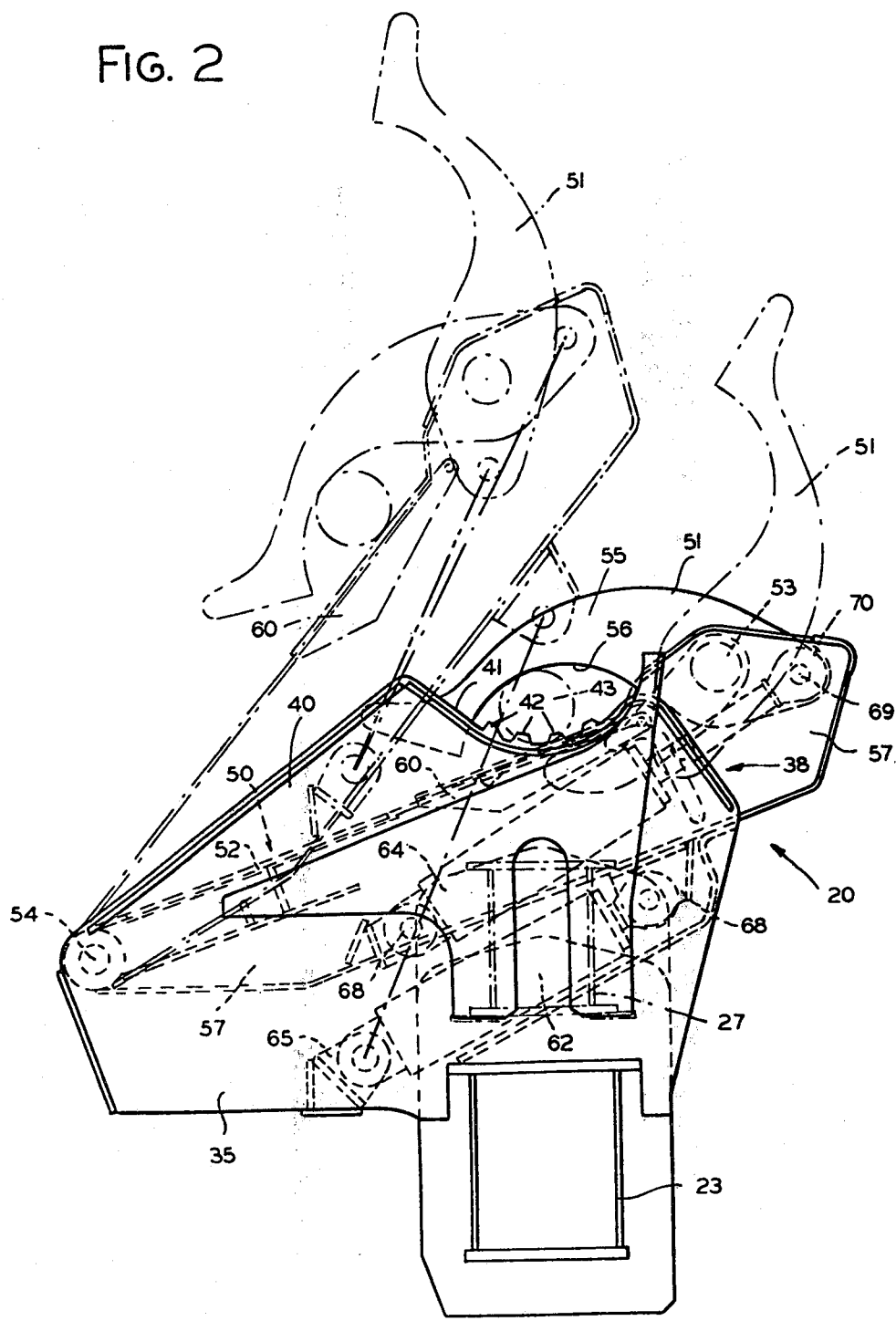
FIG. 2 is a sectional view showing the movable jaw closed upon the fixed jaw in one position and raised in dot-dash lines taken along line 2—2 of FIG. 1.
Figure 4:
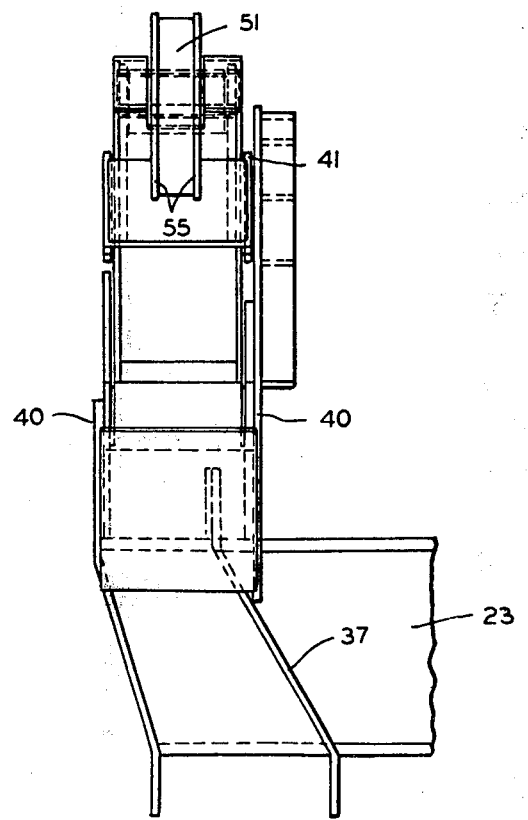
FIG. 4 is a view of the tree clamp on the side from which the tree is released.

Referring now to FIG. 2, the tree clamp 20 includes a frame 35 secured to the front of the beam 23. A goose neck portion 37 (FIG. 4) extends upwardly in offsetting relationship toward the front of the beam so as to position the tree calmp behind the delimber carriage 25 in its rearmost position and as close as possible to the felling head in its raised position (FIG. 1A). The fixed jaw 38 is formed on the upper regions of spaced structural plages 40 of the frame 35 extending transversely over the beam 23. One side of the jaw 38 provides an arcuate tooth section 41 adjacent the delimber. The tooth section conforms generally to the curve of the cradle or bottom delimber knife of the delimber carriage which will accommodate trees up to about 15 inches in diameter or as small as about 6 inches on the delimber axis as depicted at 43. A plurality of teeth 42 on the fixed jaw section 41 will penetrate the tree to hold it securely when clamped against axial movement.

Figure 3:
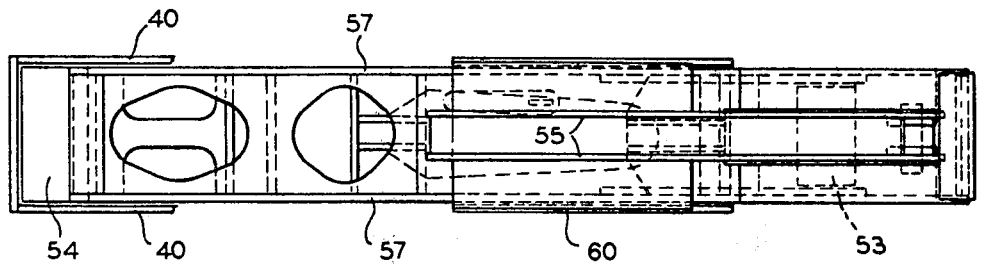
FIG. 3 is a partial plan view in the clamp showing the compact or interleaved relationship of the jaws.

A movable jaw 50 is pivoted at two places. A pin 53 pivotally carries an arm 51 on one side of the delimber axis and pin 54 on the opposite side pivotally connects the entire movable jaw between the plates 40. The pivoted arm 51 of the movable jaw is structured of a pair of elements 55 (FIG. 3) having interior arcuate surfaces 56 which overlie the delimbing axis and when folded or closed toward the tree 43, partially encircle or surround the butt end of the tree. The elements 55 are spaced closer together than spaced plates 57 of the movable jaw which in turn are speced inside of the plates 40 of the fixed jaw such that the arm 51 of the movable jaw folds inside the plates 57 which in turn fold inside the plates 40 of the fixed jaw. The elements 55 are bushed on the pin 53 carried between the plates 57 of the movable jaw while the plates 57 are bushed on pin 54 carried between the plates 40 of the fixed jaw establishing a compact or interleaved arrangement. Between the plates 40 of the fixed jaw and pivotally mounted on the plates 57 of the movable jaw is an actuator plate 60 which rests above the tops of the teeth 42 in the lowered position of the movable jaw being held there by a spring (not shown). The function of the plate 60 will be described more in detail hereinafter. Also mounted between the plates 40 of the fixed jaw is a pair of cylinders 62, 64. Cylinder 62 is mounted between plates 40 below the movable jaw. It is pivoted at its lower end at 65 and at the rod end to a bracket 68 on the bottom of the movable jaw. This is the tilt cylinder. Cylinder 64 is mounted between the plates 57 of the movable jaw and is pivotally connected at 68 on its lower end and at 69 on the rod end by a pin 70 carried between the elements 55 of the arm 51 of the movable jaw. This is the clamp cylinder. The rod of the cylinder 64 is extended in the full line position shown in FIG. 2 while the rod of the cylinder 62 is retracted. In this position the arm 51 of the movable jaw will be folded over the tree holding it firmly in engagement with the teeth 42 on the fixed jaw. The plate 60 will be depressed below the tops of the teeth of the fixed jaw by the action of the tree 43 being deposited by the felling head (FIG. 1A) on the fixed jaw with the arm 51 raised as depicted in dot-dash lines in FIG. 2.

Automatic Sequence Control

Figure 5:
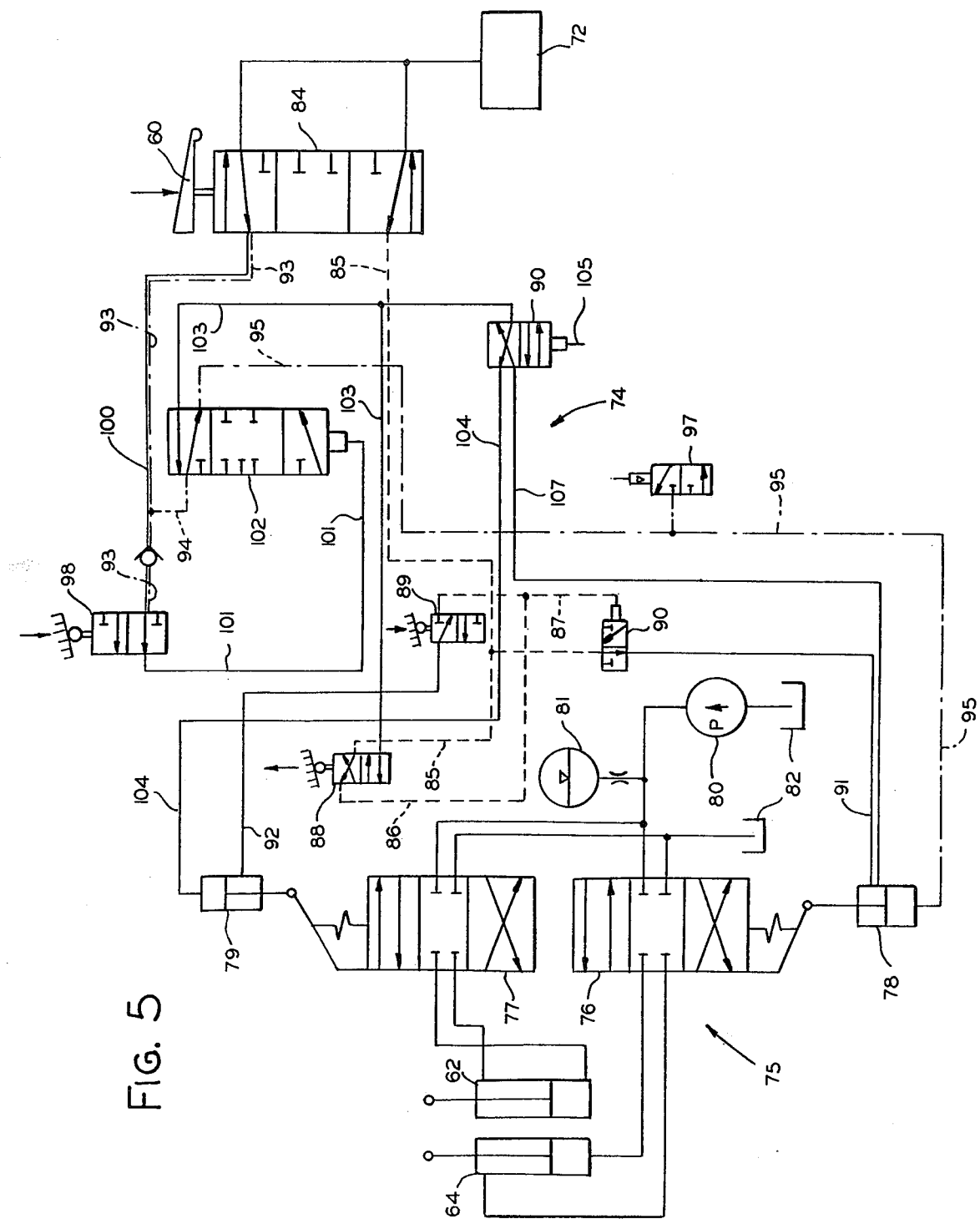
FIG. 5 is a hydropneumatic schematic of a portion of the sequence control circuit.

Referring to FIG. 5, the harvester automatic sequence control is diagrammed insofar as it pertains to the clamp actuation and its effect on the operation of the processor 17. A source of fluid pressure 72 which in the preferred embodiment is air pressure, is connected to a control circuit generally indicated by the numeral 74 which controls a hydraulic circuit generally shown at 75 for operating the tilt and clamp cylinders 62, 64 in accordance with the processor sequence. The hydraulic circuit 75 includes valves 76, 77 which are operated by pneumatic motors 78, 79 to direct hydraulic fluid from the pump 80 and under pressure from the accumulator 81 to either extend or retract cylinders 62, 64 in the appropriate sequence as determined by the pneumatic control circuit 74. Hydraulic fluid is exhausted through valves 76, 77 to a reservoir 82.

The pneumatic control circuit 74 includes a valve 84 which is connected to the pneumatic pressure source 72. At the point in the cycle where the delimber has returned to the start position as shown in FIG. 1 and in readiness to accept a tree, the valve 84 is positioned so as to pressurize a portion of the circuit depicted by dash lines 85, 86 and 87 and valves 88, 89 and 90. In this condition the pneumatic motors 78, 79 will be vented below the piston through lines 91, 92.

When a tree is loaded on the delimber, the actuating plate 60 on the movable jaw of the clamp will be depressed by the butt end of the tree as described before. This will cause actuation of the valve 84 pressurizing another portion of the circuit as depicted in dot-dash lines 93, 94, 95 pressurizing the motor 78 causing actuation then of the portion of the hydraulic circuit including valve 76 which in turn causes the clamp cylinder 64 to extend pivoting the arm 51 down and firmly clamping the tree into the fixed jaw. A valve 97 is hydraulically actuated simultaneously to start the delimber drive (not shown).

After the delimber carriage has traveled beyond the tree and the topping knives have operated to remove the upper portion of the tree the carriage will travel to the position of valve 98 mechanically actuating it to energize another portion of the circuit depicted by solid lines 100 and 101. A sequence control valve 102 is pneumatically actuated at this point to pressurize lines 103 and 104 causing actuation of the pneumatic motor 79 which in turn shifts the valve 77 in the hydraulic circuit 75 which controls the tilt cylinder 62 causing it to extend pivoting the movable jaw about pivot 54 to the position shown by dot-dash lines in FIG. 2. When this movement is completed and cylinder 62 is fully extended, hydraulic pressure will be supplied at 105 to the valve 90 in the pneumatic circuit causing it to pressurize line 107 operating the pneumatic motor 78 so as to shift the hydraulic valve 76 causing the cylinder 64 to retract and thus pivot the arm 51 which has been holding the butt end of the tree while the movable jaw is in the raised position. This is depicted in the dot-dash lines also in FIG. 2.

At this point it will be noted by referring to FIG. 2 that the movable jaw has tilted upwardly and laterally of the delimber axis in the direction of the storage rack 21 (FIG. 1). Thus, regardless of the slope the harvester may be operating on the degree of incline of the movable jaw in the tilted up position will be more than enough to assure that the delimbed and topped tree rolls into the rack 21.

While alternate embodiments of my invention have been disclosed, it will be understood that these descriptions are for purposes of illustration only and that various modifications and changes can be made to my invention without departing from the spirit and scope of it. Therefore, the limits of my invention should be determined from the following appended claims.

What is claimed is:

1. A clamp for elongated objects having a longitudinal axis of substantially greater length than the largest transverse dimension comprising a fixed jaw, a movable jaw closable on the fixed jaw, said movable jaw having separate pivotally mounted elements, one being pivoted on one side of the longitudinal axis of said object and the other being pivotally mounted on the opposite side and extending transversely below the object to pivotally connect the said one element, and means causing said elements to pivot on the said one side of the axis and thereafter pivot the one element on the other side.

2. A clamp according to claim 1 wherein said fixed jaw has spaced plates extending transversely of the longitudinal axis of said object and the elements of the movable jaw pivot between the planes of said plates.

3. A clamp according to claim 2 wherein said means includes a first cylinder operable between said plates for pivoting both elements of the movable jaw and a second cylinder also operable between the plates for pivoting the one element.

4. A clamp according to claim 3 wherein said other element has spaced plates and said one element is pivoted inside of said plates.

5. A clamp according to claim 4 wherein the spaced plates of the other element of the movable jaw pivot inside the spaced plates of the fixed jaw.

* * * * *